United States Patent [19]

Bauer et al.

[11] Patent Number: 4,979,888
[45] Date of Patent: Dec. 25, 1990

[54] APPARATUS FOR MOLDING AN ARTICLE FROM A FUSIBLE SYNTHETIC RESIN

[75] Inventors: Adolf Bauer, Olching; Peter Wagner, Weichs, both of Fed. Rep. of Germany

[73] Assignee: Krauss-Maffei Aktiengesellschaft, Munich, Fed. Rep. of Germany

[21] Appl. No.: 311,233

[22] Filed: Feb. 15, 1989

[30] Foreign Application Priority Data

Mar. 23, 1988 [DE] Fed. Rep. of Germany ....... 3809825

[51] Int. Cl.⁵ .................. B29C 41/06; B29C 41/46
[52] U.S. Cl. .................. 425/174.4; 264/126; 264/294; 264/306; 264/DIG. 60; 425/404; 425/429; 425/435; 425/446
[58] Field of Search ....... 264/301, 302, 306, DIG. 60, 264/126, 294; 425/425, 435, 404, 429, 446, 174.4

[56] References Cited

U.S. PATENT DOCUMENTS

| | | |
|---|---|---|
| 3,689,191 | 9/1972 | Westbrook et al. ............... 425/425 |
| 3,771,928 | 11/1973 | Gostyn et al. ..................... 425/425 |
| 4,583,932 | 4/1986 | Meuret ............................... 425/182 |
| 4,601,652 | 7/1986 | Ando et al. ................. 425/DIG. 620 |

FOREIGN PATENT DOCUMENTS

| | | |
|---|---|---|
| 0177906 | 4/1986 | European Pat. Off. ............ 425/425 |
| 0218043 | 4/1987 | European Pat. Off. . |
| 2365148 | 7/1974 | Fed. Rep. of Germany ...... 425/435 |
| 2134222 | 12/1972 | France ......................... 264/DIG. 60 |

Primary Examiner—James C. Housel
Attorney, Agent, or Firm—Herbert Dubno; Andrew Wilford

[57] ABSTRACT

An apparatus for reflow smoothing a molded article made by first heating a face of a mold at a first station, then applying a fusible synthetic resin to the heated face and thereby melting the resin into a continuous coating covering the heated mold face at a second station spaced angularly from the first station, and cooling the coating and mold at the second station until the coating hardens. To reflow smooth the article, the surface of the cooled coating is then smoothed by confining the mold and hardened coating in a substantially closed chamber at the second station and reheating the confined coating until its surface flows. Thereafter the coating is cooled again at a third station angularly spaced from and downstream of the second station until it hardens and the hardened covering is stripped from the mold at a fourth station angularly spaced downstream of the third station and upstream of the first station.

9 Claims, 5 Drawing Sheets

APPARATUS FOR MOLDING AN ARTICLE FROM A FUSIBLE SYNTHETIC RESIN

FIELD OF THE INVENTION

The present invention relates to method of and apparatus for molding a workpiece of a thermoplastic resin. More particularly this invention concerns the reflow smoothing of a molded article formed by application of a powder to a heated mold surface.

BACKGROUND OF THE INVENTION

It is standard to form a three-dimensional workpiece of a thermoplastic resin by first heating an appropriately shaped mold, then applying a fusible powder, for instance of polyethylene, to the heated mold surface until it melts, and then cooling the mold and fused layer of resin thereon and stripping it from the mold. To ensure that the surface of the molded piece is smooth it is standard to subject it to a reflowing operation in which the surface of the hardened workpiece is heated sufficiently to melt it and allow it to flow slightly.

Such reflowing is typically carried out by passing the finished workpiece through a tunnel-type oven. Air is heated in this oven and directed over the workpiece as it moves through, melting the surface and causing it to flow smooth. The substantial disadvantage of this system is that the oven is very bulky and consumes a substantial amount of energy. In addition dust-and moisture-carrying air are drawn into the open ends of the oven and particles and droplets can get stuck to the finished workpiece, ruining it.

OBJECTS OF THE INVENTION

It is therefore an object of the present invention to provide an improved method of and apparatus for reflow smoothing a molded article.

Another object is the provision of such an improved method of and apparatus for reflow smoothing which overcomes the above-given disadvantages, that is which is not bulky, does not consume excessive amounts of energy, and that protects the workpiece while its surface is still fused from picking up particles.

SUMMARY OF THE INVENTION

A molded article is made by first heating a face of a mold, then applying a fusible synthetic resin to the heated face and thereby melting the resin into a continuous coating covering the heated mold face, and cooling the coating and mold until the coating hardens. The surface of the cooled coating is then smoothed by confining the mold and hardened coating in a substantially closed chamber and reheating the confined coating until its surface flows. Thereafter the coating is cooled again until it hardens and the rehardened coating is stripped from the mold.

With this system, therefore, the workpiece is protected during the delicate stage when its surface is liquid and sticky and therefore susceptible to picking up dust or being otherwise damaged. In addition the heat for the reflowing step is very efficiently applied just where it is needed, and the equipment is fairly compact and simple.

Normally according to this invention the confined coating is heated radiantly while air is circulated inside the chamber and the powder is applied to the mold by first orienting the heated face of the mold so it faces downward, then covering the downwardly directed heated face of the mold with a vessel containing the powder, and finally inverting the covered mold and vessel.

The apparatus according to this invention therefore has a substantially closed chamber closable around the mold and coating for confining the mold and heaters in the chamber for reheating the coating until its surface flows. The heaters are normally radiant and are associated with a recirculating blower inside the chamber. For most effective coating the chamber and mold with its coating are rotated about two relatively transverse axes during the reheating step.

To avoid all contamination of the workpiece and the surrounding area, a clean gas is introduced into the chamber during the reheating step and gases are withdrawn from the chamber during the reheating step. The clean gas may be an inert gas, and a cool gas may be introduced after the reflowing step to assist in hardening the workpiece.

DESCRIPTION OF THE DRAWING

The above and other objects, features, and advantages will become more readily apparent from the following, reference being made to the accompanying drawing in which.

SPECIFIC DESCRIPTION

Figure 1:
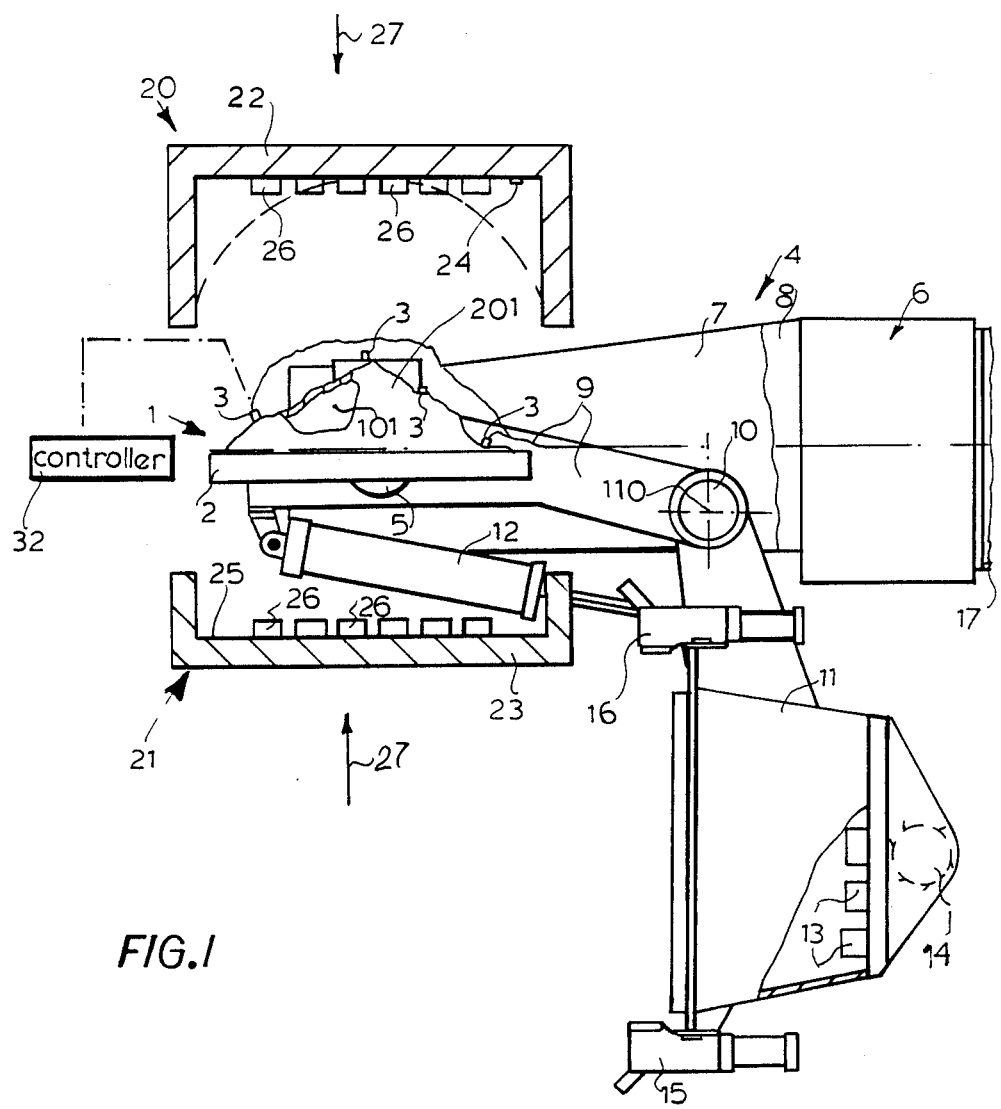
FIG. 1 is a partly diagrammatic and sectional small-scale side view of the apparatus according to this invention during the mold-heating step.

As seen in FIG. 1 a mold 1 is carried in a frame-type holder 2 and has a concave workpiece-forming front face 101 and an opposite convex back face 201 to which is secured an array of temperature sensors 3 all connected to a controller 32. A mount 4 for the holder 2 has a crosspiece 6 from which extend two arms 7 and 8 (see FIG. 5) carrying coaxial gudgeon pins 5 seated in the holder 2 and defining a primary normally horizontal pivot axis 105 therefor.

A pair of arms 9 fixed on the support 2 carry a pivot 10 defining an axis 110 parallel to the axis 105 but offset therefrom. A reflow-type smoothing hood 11 is pivotal on this axis 110 by means of a hydraulic actuator 12 controlled by the controller 32 and linked between the arms 9 and the hood 11 for movement between the position of FIGS. 1 and 2 offset from the mold 1 and the position of FIGS. 3 and 4 closed over the mold 1. This smoothing hood is provided internally with an array of radiant heaters 13 and with a small circulating blower 14. A pair of hydraulically operated clamps 15 and 16 at opposite edges of the hood 11 can clamp it solidly in place on the holder 2.

Figure 5:
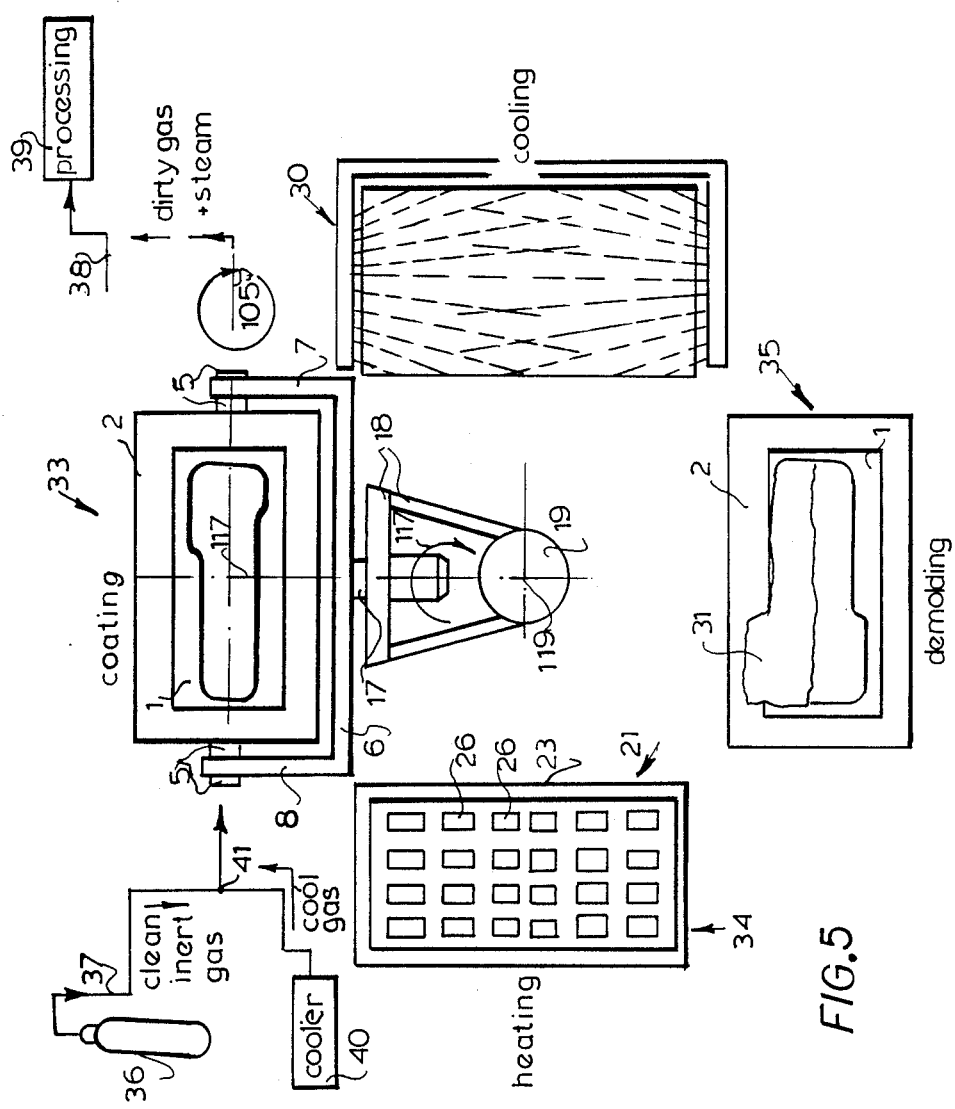
FIG. 5 is a small-scale diagrammatic top view illustrating the sequence of all steps according to the invention.

In addition as best seen in FIG. 5 the mount 4 itself is carried on a shaft 17 defining a normally horizontal axis 117 perpendicular to and intersecting the axis 105. An unillustrated actuator operated by the controller 32 can therefore rotate the entire holder and the mold 1 about this axis 117 also. Finally the shaft 17 is seated in a holder 18 carried on an upright master shaft 19 rotatable about a vertical axis 119 perpendicular to the axis 117. Another unillustrated actuator operated by the controller 32 can rotate the shaft 19 about its axis 119 to move the mold 1 in the holder between a cooling station 30, a coating station 33, a heating station 34, and a demolding station 35.

As seen in FIG. 1 the heating station 34 comprises downwardly and upwardly open hood elements 20 and 21 having floors 22 and 23 whose confronting surfaces 24 and 25 are provided with respective arrays of radiant heaters 26 controlled by the controller 32. These two parts 20 and 21 can be moved vertically toward one another as illustrated by arrows 27 by unillustrated actuators operated by the controller 32.

Figure 2:
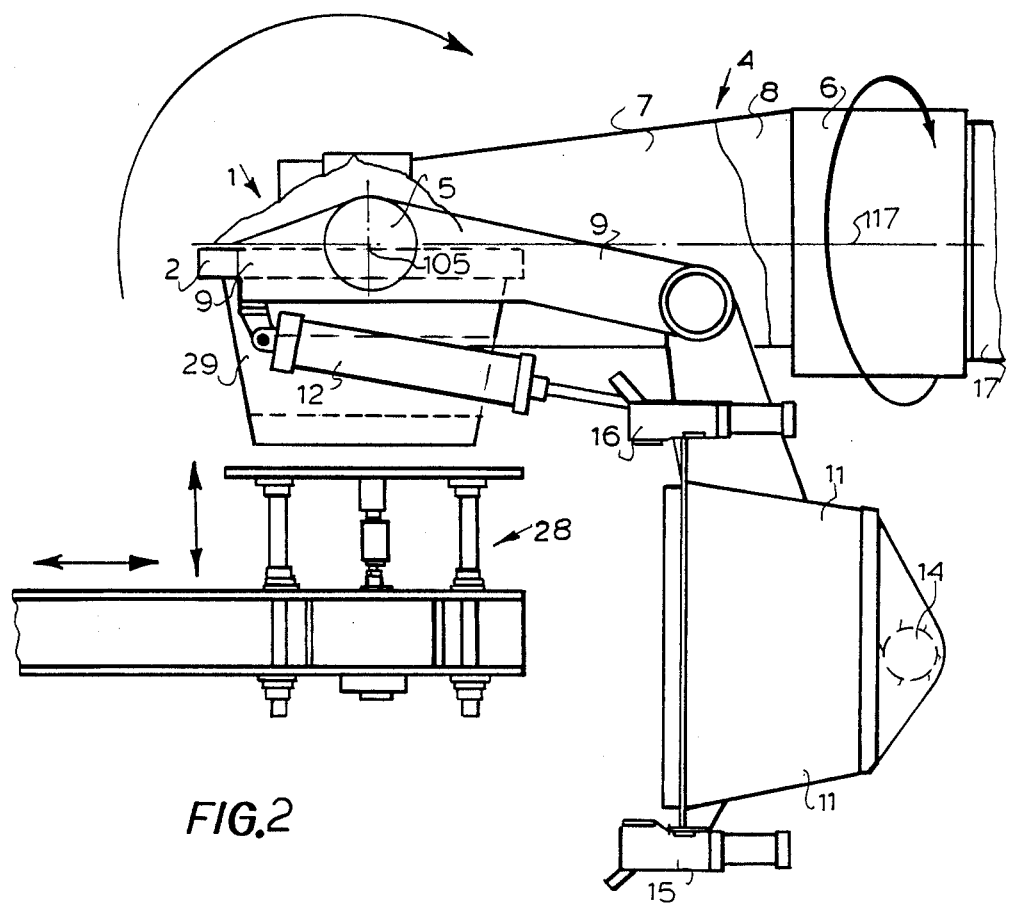
FIG. 2 is another such view during the second mold-coating step.

In the coating station 33 as seen in FIG. 2 a conveyor 28 can fit a vessel 29 containing a quantity of a thermoplastic powder to the holder 2 over the front face 101 of the mold 1. This vessel 29 is dimensioned to fit within the smoothing hood 11.

The apparatus described above functions as follows:

To start with as shown in FIG. 1 the reflowing hood 11 is moved into the open position and the mold 1 is positioned between the parts 20 and 21 of the heating station 34. These parts 20 and 21 are closed as indicated by arrows 27 over the mold 1 and the sources 26 are energized to heat both faces 101 and 201. The spacing of the sources 26 from the mold 1 or the power with which these sources 26 is energized may be controlled from the controller 32 in accordance with the temperatures detected by the sensors 3 in order to ensure that the mold 1 is uniformly heated.

Figure 3:
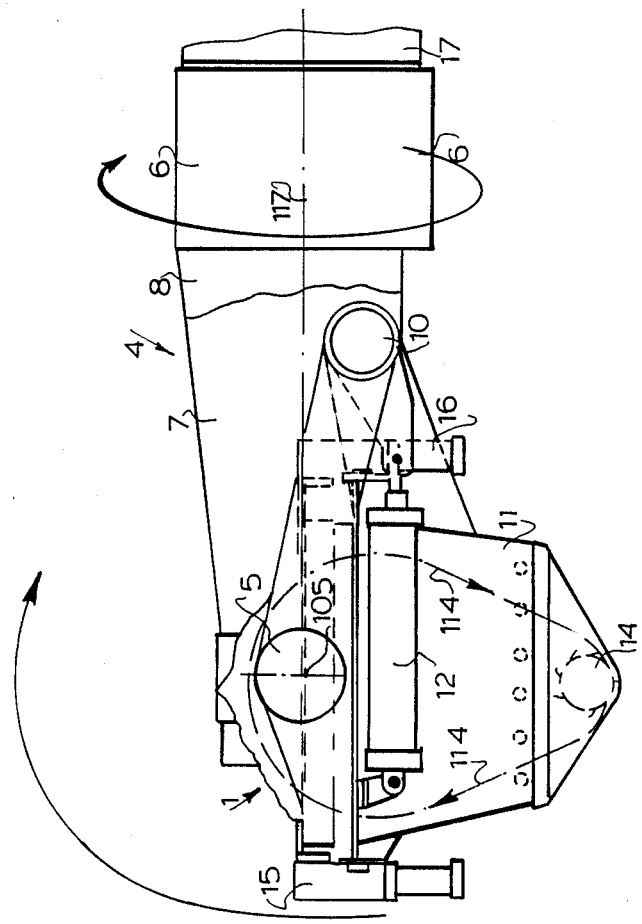
FIG. 3 is another such view during the third smoothing step.

Thereafter the assembly is pivoted about the axis 119 from the station 34 to the station 33 where as shown in FIG. 2 a vessel 29 containing a thermoplastic powder is fitted by a conveyor 28 under the holder 2. Then as seen in FIG. 3 the actuator 12 closes the reflowing hood and the mold 1 is rotated about the axes 105 and 117. This action clamps the vessel 29 tightly in place on the holder 2 and thereby effectively coats the hot mold 1 with the powder which sticks to it and fuses.

The actuator 12 then opens the hood 11 so that the vessel 29 can be removed, and then closes the hood 11 again, whereupon the heaters 13 and blower 14 are set in operation to ensure smooth melting of the surface of the powder coating on the mold 1. During this time, once again, the entire chamber formed by the hood 11 and the holder 2 and mold 1 is rotated about the two axes 105 and 117 so that, as the surface of the coating on the mold 1 hardens, it flows to perfect smoothness and forms a nearly perfectly uniform thickness Meanwhile a clean inert gas, for instance nitrogen, is introduced as indicated in FIG. 5 through one of the gudgeons 5 from a bottle 36 through a conduit 37 to the chamber inside the hood 11 while steam and pollutant gases are withdrawn through another conduit 38 and processed at 39. In this manner the remelted surface of the workpiece remains clean.

Figure 4:
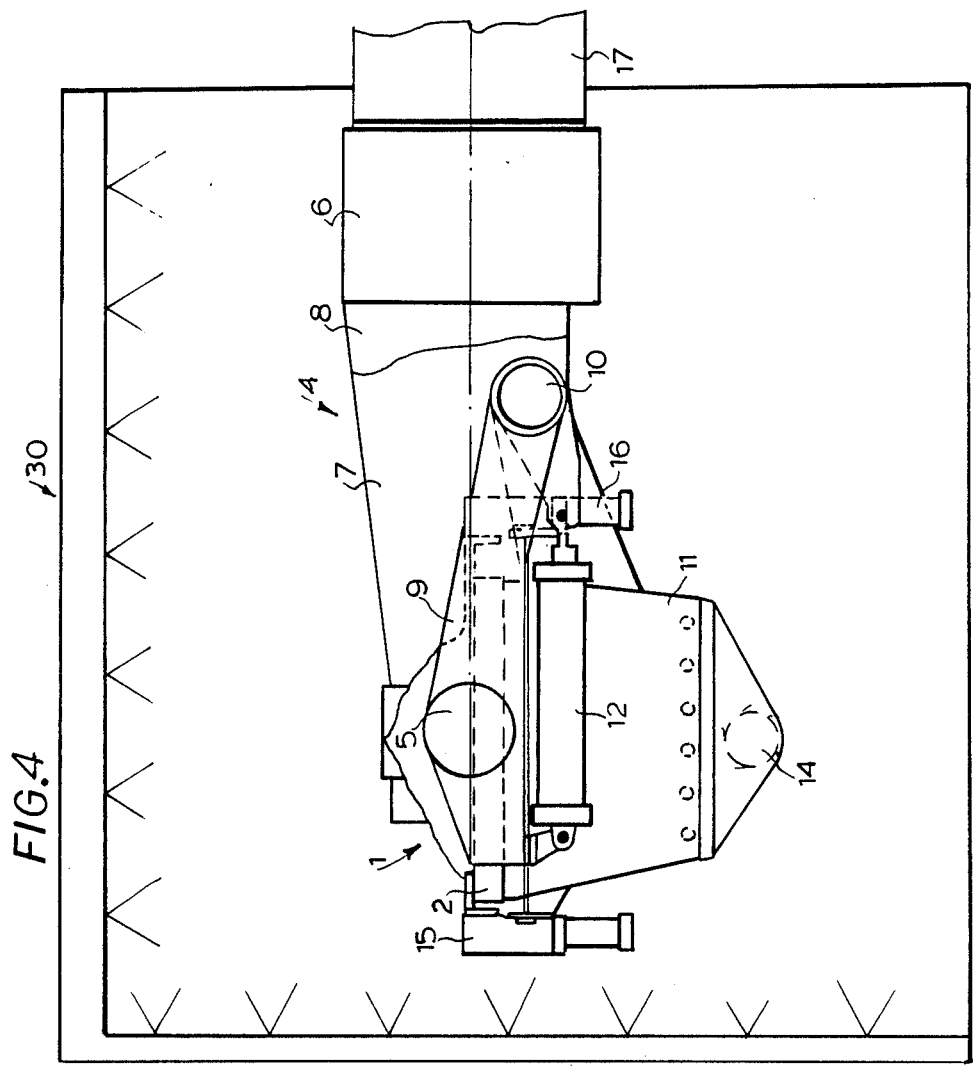
FIG. 4 is another such view during the fourth cooling step.

The closed assembly is them moved by rotation about the axis 119 to the cooling station 30 as shown in FIG. 4 where the coating is cooled and hardened by either spraying the closed chamber with cool water and/or by subjecting it to jets of cool air. While being moved the inside of the container can be flooded with a cool gas from a source 40 as also indicated schematically in FIG. 5, with a valve 41 being provided to switch the gas input from the inert to the cooling gas. Then it is moved into the demolding station 35 where the finished workpiece 31 is stripped from the mold.

The reflow smoothing in the station 33 is conducted in a substantially closed space as are all of the subsequent operations so that contamination of the mold 1 is virtually impossible. As a result the finished workpiece can be counted on to be virtually perfect.

We claim:

1. An apparatus for making a molded article from a fusible synthetic resin, the apparatus comprising:
    a mold having a front face of a shape corresponding to the article to be made and a back face;
    transport means for pivoting the mold in an angular transport direction about a central upright axis through a heating station, a coating station offset angularly downstream therefrom, a cooling station offset angularly downstream therefrom, and a demolding station offset angularly downstream from the cooling station and angularly upstream from the heating station, the stations being generally angularly equispaced about the axis;
    means at the heating station for heating the front face of the mold;
    means at the coating station for applying a fusible synthetic resin to the heated front face and thereby melting the resin into a continuous coating covering the mold front face;
    means at the coating station for cooling the coating and mold until the coating hardens;
    means at the coating station including a chamber closable around the mold and coating for confining the mold;
    means in the chamber for reheating the coating until its surface flows;
    means at the cooling station for recooling the coating and mold until the coating hardens again; and
    means at the demolding station for stripping the hardened covering from the mold.

2. The apparatus defined in claim 1 wherein the heating means in the chamber includes a plurality of radiant heat sources directed at the front mold face and the coating thereon.

3. The apparatus defined in claim 2 wherein the heating means in the chamber includes a blower in the chamber for recirculating gases therein over the coating.

4. The apparatus defined in claim 2, further comprising means for rotating the chamber and mold and coating therein about two relatively transverse axes during the reheating step.

5. The apparatus defined in claim 2, further comprising means for introducing a clean gas into the chamber during the reheating step.

6. The apparatus defined in claim 2, further comprising means for withdrawing gases from the chamber during the reheating step.

7. The apparatus defined in claim 2, further comprising means for introducing an inert gas into the chamber during the reheating step.

8. The apparatus defined in claim 2, further comprising means for introducing a cool gas into the chamber during the reheating step.

9. The apparatus defined in claim 2, further comprising means for withdrawing gases from the chamber during the reheating step and for processing and cleaning the withdrawn gases.

* * * * *